(12) United States Patent
Ezaki

(10) Patent No.: US 8,060,051 B2
(45) Date of Patent: Nov. 15, 2011

(54) RADIO COMMUNICATION APPARATUS AND FREQUENCY OFFSET CALCULATION METHOD

(75) Inventor: Takato Ezaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 413 days.

(21) Appl. No.: 12/409,760

(22) Filed: Mar. 24, 2009

(65) Prior Publication Data

US 2009/0305642 A1 Dec. 10, 2009

(30) Foreign Application Priority Data

Jun. 9, 2008 (JP) ................................. 2008-150461

(51) Int. Cl.
*H04B 1/06* (2006.01)

(52) U.S. Cl. ........ 455/337; 455/205; 455/214; 375/334; 375/337

(58) Field of Classification Search ........................ None
See application file for complete search history.

(56) References Cited

U.S. PATENT DOCUMENTS

| | | | |
|---|---|---|---|
| 6,347,126 B1* | 2/2002 | Nagayasu et al. | 375/344 |
| 6,674,814 B2* | 1/2004 | Tanada | 375/326 |
| 7,349,483 B2* | 3/2008 | Seki et al. | 375/260 |
| 2001/0008543 A1* | 7/2001 | Tanada | 375/232 |
| 2004/0125771 A1 | 7/2004 | Subrahmanya | |
| 2007/0030927 A1 | 2/2007 | Jard et al. | |
| 2007/0058683 A1 | 3/2007 | Futami et al. | |
| 2008/0101306 A1 | 5/2008 | Bertrand et al. | |

FOREIGN PATENT DOCUMENTS

| | | |
|---|---|---|
| EP | 1052784 | 11/2000 |
| EP | 1113636 | 7/2001 |
| EP | 1764968 | 3/2007 |
| JP | 7-74726 | 3/1995 |
| JP | 2002-26769 | 1/2002 |
| JP | 2006-349587 | 12/2006 |
| WO | 2004023672 | 3/2004 |

OTHER PUBLICATIONS

European Search Report dated Aug. 18, 2010 from corresponding European Application No. EP 09 15 7020.

* cited by examiner

*Primary Examiner* — Long Nguyen
(74) *Attorney, Agent, or Firm* — Katten Muchin Rosenman LLP

(57) ABSTRACT

In a radio communication apparatus, a frequency offset calculator of the radio communication apparatus calculates a frequency offset of the received radio signal from the reception frequency of the radio communication apparatus. An averaging unit averages the frequency offset calculated by the frequency offset calculator. A moving speed calculator calculates the moving speed of an associated radio communication apparatus with which the radio communication apparatus is communicating, based on the frequency offset calculated by the frequency offset calculator. An averaging time changer changes an averaging time for which the frequency offset is averaged by the averaging unit, in accordance with the moving speed of the associated radio communication apparatus calculated by the moving speed calculator.

7 Claims, 13 Drawing Sheets

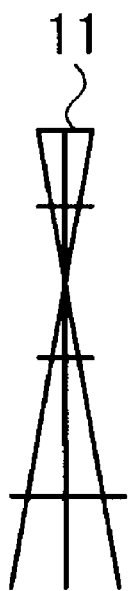
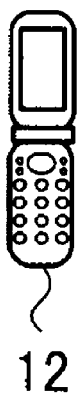
FIG. 2

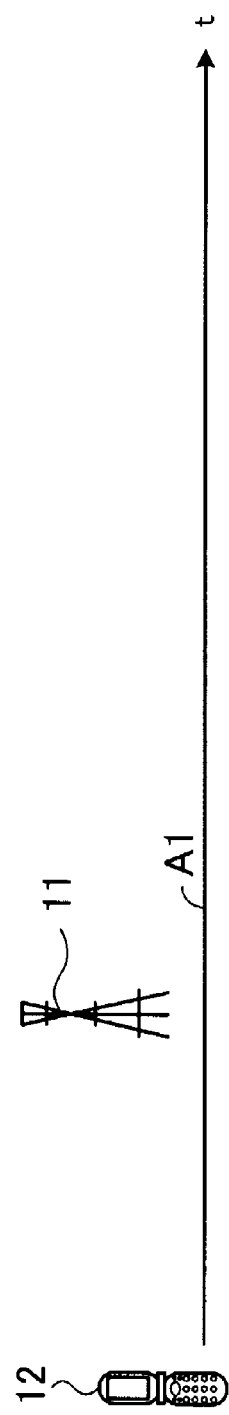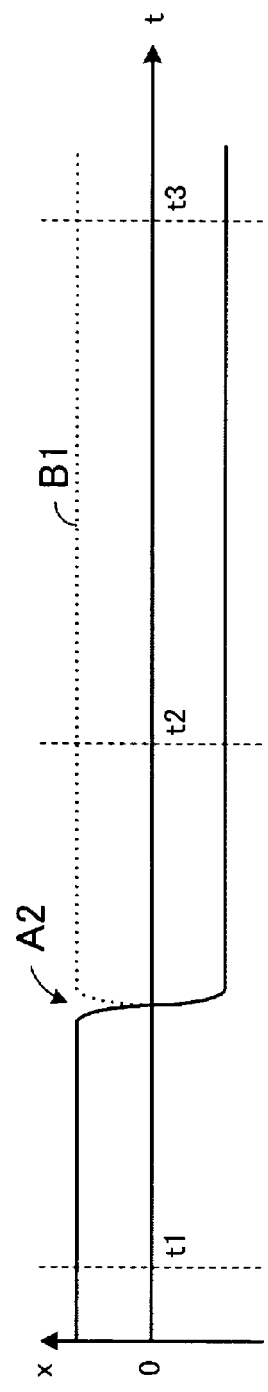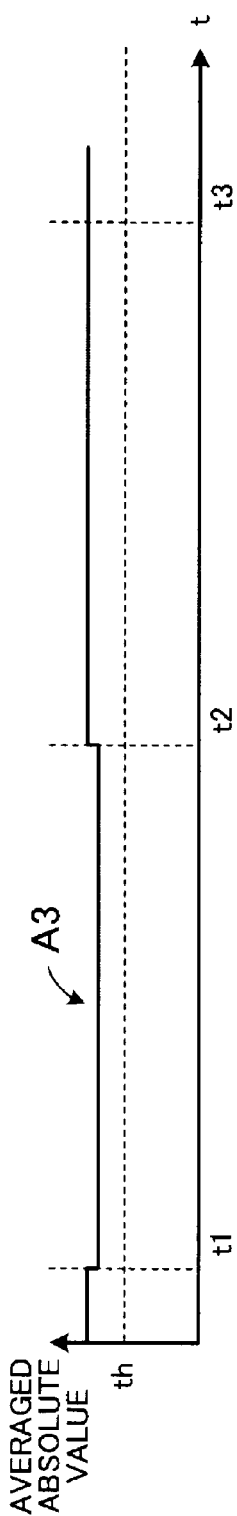

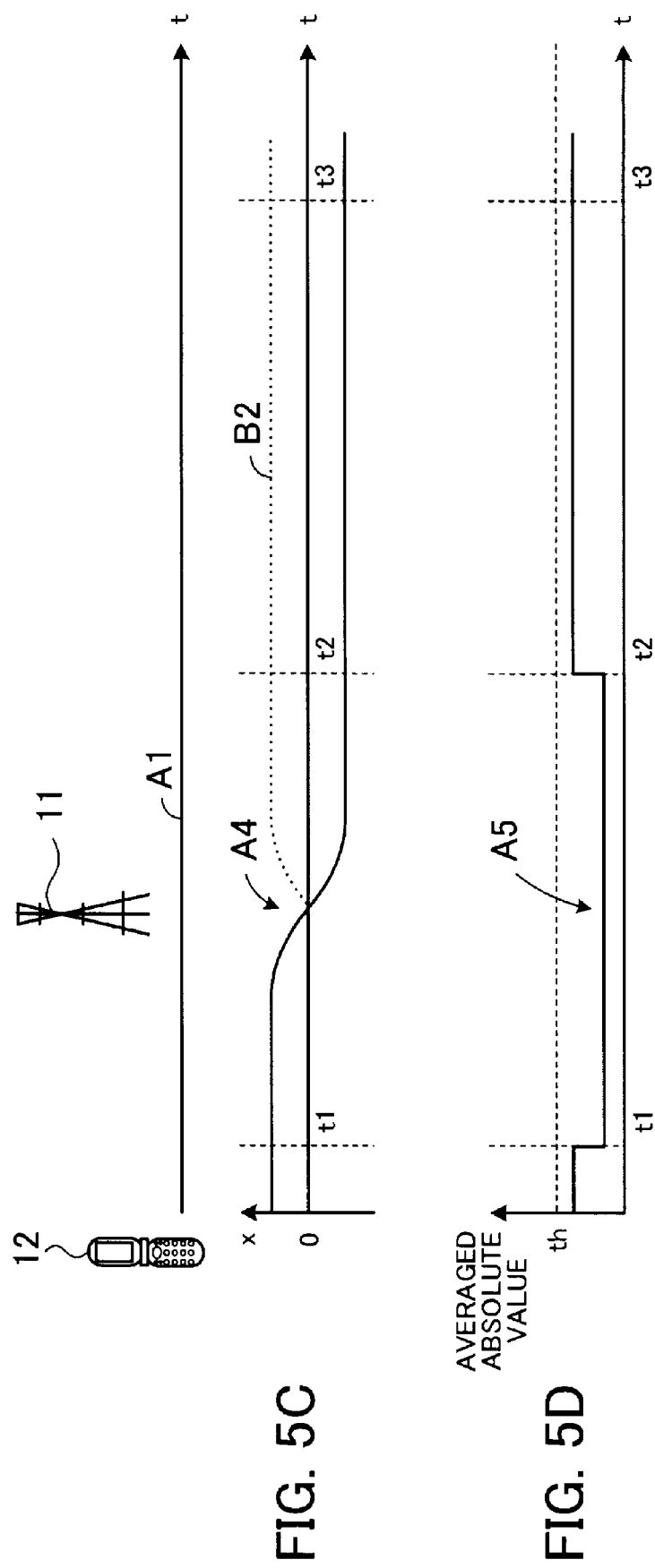

RADIO COMMUNICATION APPARATUS AND FREQUENCY OFFSET CALCULATION METHOD

CROSS-REFERENCE TO RELATED APPLICATIONS

This application is based upon and claims the benefits of priority of the prior Japanese Patent Application No. 2008-150461, filed on Jun. 9, 2008, the entire contents of which are incorporated herein by reference.

FIELD

The Embodiments discussed herein are related to radio communication apparatus and frequency offset calculation methods.

BACKGROUND

In mobile communications, a radio communication apparatus fails to properly receive a radio signal to be received if the reception frequency thereof differs from the frequency of the radio signal. Accordingly, a radio communication apparatus used in mobile communications is equipped with AFC (Automatic Frequency Control) so that the reception frequency thereof can be adjusted to the frequency of a radio signal to be received (see, e.g., Japanese Laid-open Patent Publications No. 2006-349587, No. 07-74726, and No. 2002-26769).

Meanwhile, in cases where a radio terminal moves at high speed near a radio base station, for example, where a Shinkansen bullet train moves through a tunnel while the radio terminal is used in the train, the phase of the radio signal undergoes ultrafast polarity reversal due to the Doppler effect. The AFC of the radio base station therefore needs to have very high tracking capability so that such a radio signal can be properly received.

On the other hand, phase rotation of the received signal observed at the radio base station originates mostly from instability of the oscillator. Thus, where noise and the like attributable to instability of the oscillator is taken into consideration, the AFC needs to have high stability, rather than high tracking capability.

The tracking capability and stability of the AFC are in the trade-off relationship. Thus, if the tracking capability of the AFC is enhanced in order that the radio signals from radio terminals moving at high speeds can be received, the reception quality of radio signals from radio terminals moving at low speeds lowers. On the other hand, if the stability of the AFC is enhanced so as to improve the reception quality of radio signals from slow-moving radio terminals, then it is difficult to receive radio signals from fast-moving radio terminals.

In this manner, it has been difficult to improve both the reception quality of radio signals from fast-moving radio terminals and that of radio signals from slow-moving radio terminals.

SUMMARY

According to an aspect of the invention, a radio communication apparatus configured to calculate a frequency offset includes: a frequency offset calculator which calculates the frequency offset of a received radio signal from a reception frequency of the radio communication apparatus; an averaging unit which averages the frequency offset calculated by the frequency offset calculator; a moving speed calculator which calculates a moving speed of an associated radio communication apparatus with which the radio communication apparatus is communicating, based on the frequency offset calculated by the frequency offset calculator; and an averaging time changer which changes an averaging time for which the frequency offset is averaged by the averaging unit, in accordance with the moving speed of the associated radio communication apparatus calculated by the moving speed calculator.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 exemplifies the configuration of a radio communication system according to a first embodiment;

FIGS. 5A to 5D illustrate operation of a high speed discriminator appearing in FIG. 4;

DESCRIPTION OF EMBODIMENT(S)

Embodiments of the present invention will be explained with reference to accompanying drawings.

Figure 1:
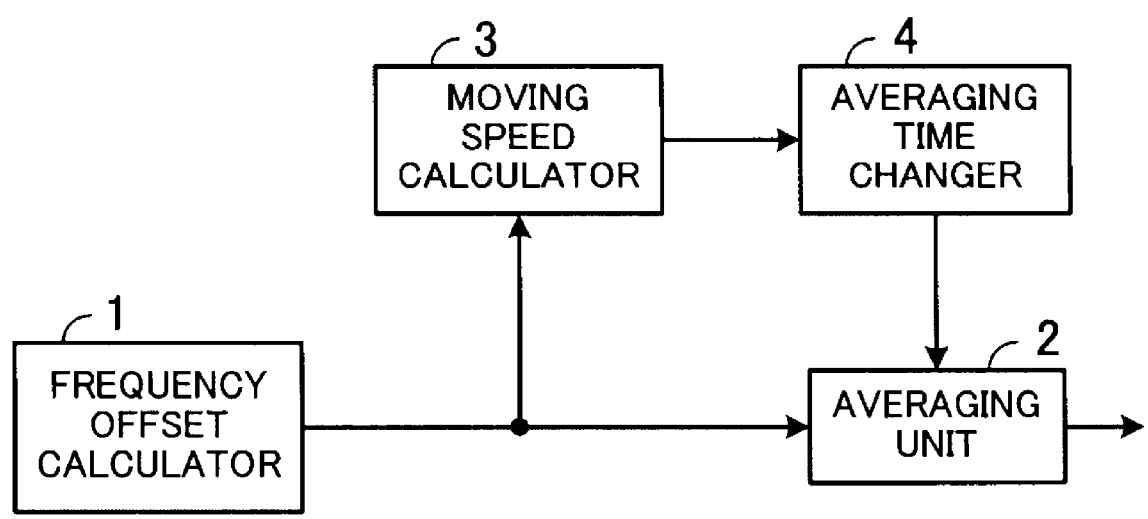
FIG. 1 schematically illustrates a radio communication apparatus.

FIG. 1 schematically illustrates a radio communication apparatus. As illustrated in FIG. 1, the radio communication apparatus includes a frequency offset calculator 1, an averaging unit 2, a moving speed calculator 3, and an averaging time changer 4.

The frequency offset calculator 1 calculates the frequency offset of a received radio signal from the reception frequency of the radio communication apparatus.

The averaging unit 2 averages the frequency offset calculated by the frequency offset calculator 1.

The moving speed calculator 3 calculates, based on the frequency offset calculated by the frequency offset calculator 1, the moving speed of an associated radio communication apparatus with which this radio communication apparatus is communicating.

The averaging time changer 4 changes an averaging time for which the frequency offset is averaged by the averaging unit 2, in accordance with the moving speed of the associated radio communication apparatus calculated by the moving speed calculator 3.

For example, when the moving speed of the associated radio communication apparatus is high, the averaging time changer 4 shortens the averaging time of the averaging unit 2. This enables the radio communication apparatus to improve its capability to track the frequency offset of the radio signal from the associated radio communication apparatus moving at high speed. On the other hand, when the moving speed of the associated radio communication apparatus is low, the averaging time changer 4 prolongs the averaging time of the averaging unit 2. This permits the radio communication apparatus to improve its stability against the frequency offset of the radio signal from the associated radio communication apparatus moving at low speed.

Thus, the radio communication apparatus changes the averaging time for averaging the frequency offset, in accordance with the moving speed of the associated radio communication apparatus. It is therefore possible to improve the reception quality of the radio signal regardless of whether the associated radio communication apparatus is moving at high speed or at low speed.

A first embodiment will be now described in detail with reference to the accompanying drawings.

FIG. 2 exemplifies the configuration of a radio communication system according to the first embodiment. In FIG. 2, a radio base station 11 and a radio terminal 12 are illustrated.

The radio base station 11 and the radio terminal 12 are capable of radio communication with each other by means of a communication scheme such as W-CDMA (Wideband Code Division Multiple Access) or LTE (Long Term Evolution), for example. The radio terminal 12 is, for example, a mobile phone.

The radio base station 11 estimates a offset (frequency offset) between the frequency of a received radio signal and the reception frequency of the radio base station 11 so that the radio signal from the radio terminal 12 can be received properly. The frequency offset can be estimated, for example, by averaging the correlation of a known symbol such as a pilot signal. Where the averaging time for averaging such a correlation value is prolonged (where the amount of data on the correlation value to be averaged is increased), the estimation results are improved in tolerance to noise. On the other hand, where the averaging time is shortened, the capability to track a sudden change in the frequency due to the Doppler effect or the like improves.

If the frequency of the received radio signal suddenly changes while the correlation value averaging time is set long, the frequency offset estimated by the radio base station 11 may possibly fail to follow such a sudden change. In this case, the radio base station 11 becomes unable to properly receive the radio signal from the radio terminal 12, possibly resulting in interruption of voice communication or the like. On the other hand, where the correlation value averaging time is set short, the radio base station can track a sudden frequency change, but the tolerance to noise lowers.

Accordingly, the radio base station 11 determines whether the moving speed of the radio terminal 12 (speed relative to the radio base station 11) is high or low. When the moving speed of the radio terminal 12 is judged high, the radio base station 11 shortens the correlation value averaging time to improve the tracking capability so that the frequency offset can be estimated quickly in response to a sudden frequency change. When the moving speed of the radio terminal 12 is judged low, on the other hand, the radio base station 11 lengthens the correlation value averaging time so as to improve the noise tolerance of the frequency offset estimation.

The radio base station 11 can therefore receive the radio signal from the radio terminal 12 with improved reception quality regardless of whether the moving speed of the radio terminal 12 is high or low.

Figure 3:
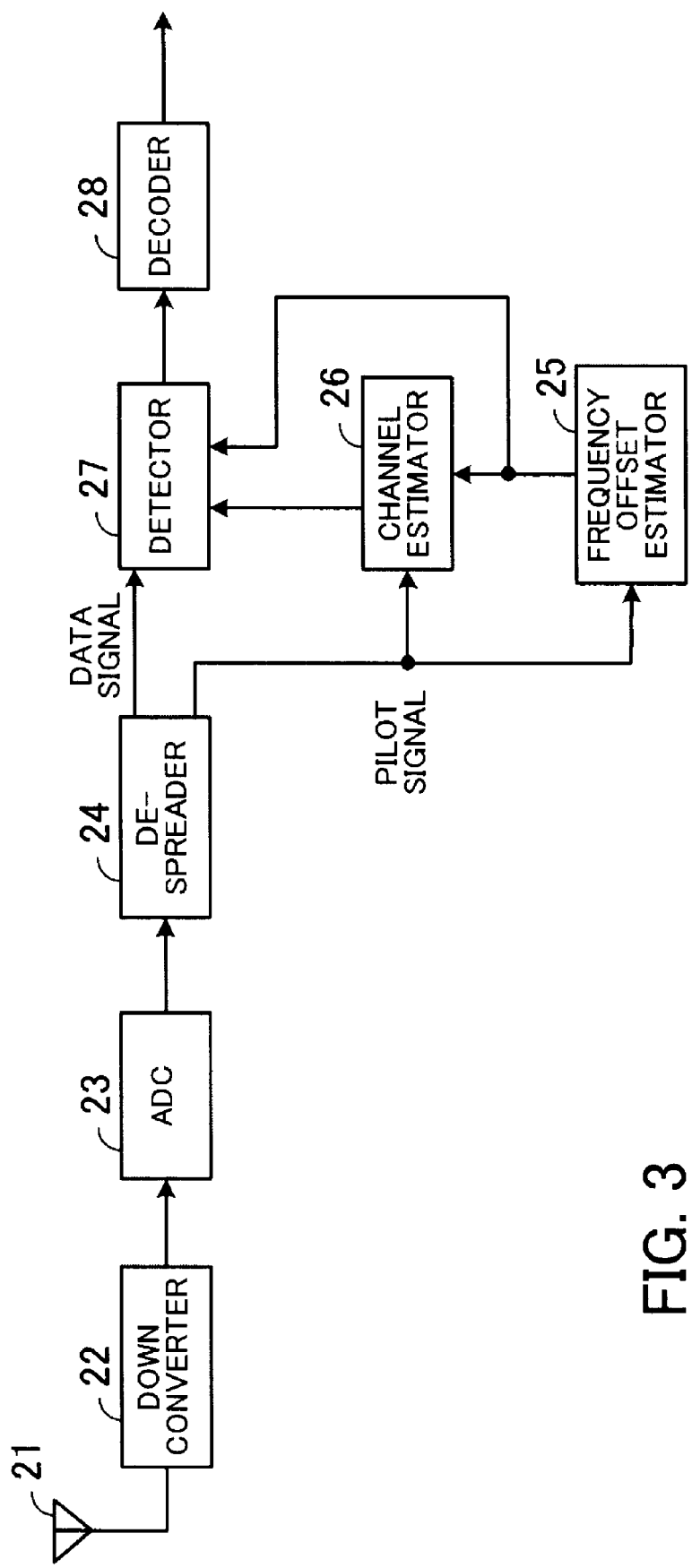
FIG. 3 is a block diagram illustrating part of a radio base station appearing in FIG. 2.

FIG. 3 is a block diagram illustrating part of the radio base station appearing in FIG. 2. As illustrated in FIG. 3, the radio base station 11 includes an antenna 21, a down converter 22, an ADC (Analog to Digital Converter) 23, a de-spreader 24, a frequency offset estimator 25, a channel estimator 26, a detector 27, and a decoder 28.

The antenna 21 receives the radio signal transmitted from the radio terminal 12. The down converter 22 is provided with an oscillator and, using the signal output from the oscillator, down-converts the frequency of the radio signal received by the antenna 21.

The ADC 23 converts the down-converted radio signal to a digital signal (baseband signal), and outputs the converted digital baseband signal to the de-spreader 24.

Using a spreading code, the de-spreader 24 de-spreads the baseband signal output from the ADC 23. As a consequence, the baseband signal is separated according to users (radio terminals) and also according to channels (e.g., data signal and pilot signal). The separated channels are, for example, DPDCH (Dedicated Physical Data Channel) and DPCCH (Dedicated Physical Control Channel). The data signal separated on a user-by-user basis is output to the detector 27, while the pilot signal is output to the frequency offset estimator 25 and the channel estimator 26.

The frequency offset estimator 25 estimates the frequency offset of the pilot signal from the frequency of the oscillator in the down converter. Specifically, the frequency offset estimator 25 estimates the frequency offset of the pilot signal by averaging the correlations of the known pilot signal received at different timings. The frequency offset estimator 25 outputs the estimated frequency offset of the pilot signal to the channel estimator 26 and the detector 27.

Based on the pilot signal output from the de-spreader 24, the channel estimator 26 estimates the channel via which the radio signal has been propagated. Since the channel estimator 26 is input with the frequency offset from the frequency offset estimator 25, the channel can be estimated taking account of phase rotation of the radio signal.

The detector 27 detects the data signal output from the de-spreader 24, on the basis of the estimated propagation channel output from the channel estimator 26 and the estimated value of frequency offset.

The decoder 28 decodes the detected data signal output from the detector 27, and outputs the decoded signal to the subsequent-stage circuit.

The radio base station 11 receives radio signals from multiple users. It is therefore difficult to correct the frequency of the oscillator in the down converter 22 for the sake of a single user only so that the frequency offset of the received signal may be compensated. Thus, the frequency offset estimator 25 estimates the frequency offsets of individual users by using the pilot signal, and the channel estimator 26 estimates the channels of the individual users taking account of the respective frequency offsets. Also, the detector 27 demodulates the data signals taking account of the respective frequency offsets. Consequently, even if the offset of the frequency of the radio signal from the reception frequency of the radio base station 11 differs from user to user, the radio base station 11 can appropriately process the received radio signals.

Figure 4:
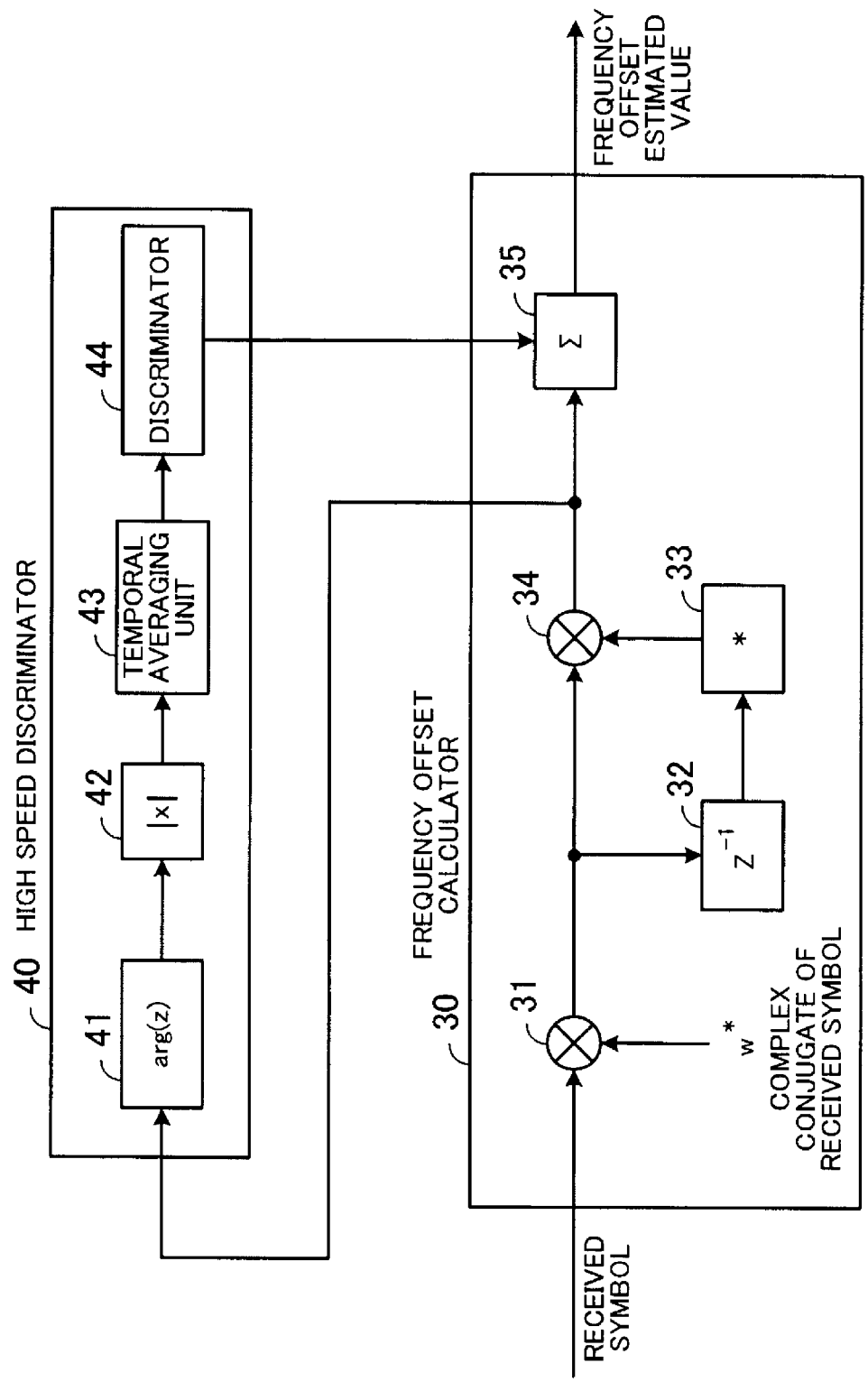
FIG. 4 is a block diagram of a frequency offset estimator appearing in FIG. 3.

FIG. 4 is a block diagram of the frequency offset estimator appearing in FIG. 3. As illustrated in FIG. 4, the frequency offset estimator 25 includes a frequency offset calculator 30 for calculating the frequency offset of the pilot signal, and a high speed discriminator 40 for determining the speed of the radio terminal 12. The frequency offset calculator 30 and the high speed discriminator 40 are implemented, for example, by executing a program by a CPU (Central Processing Unit). Alternatively, dedicated semiconductor apparatuses may be used.

The frequency offset calculator 30 includes multipliers 31 and 34, a delay unit (in FIG. 4, "$Z^{-1}$") 32, a complex conjugate calculator (in FIG. 4, "*") 33, and an integrator (in FIG. 4, "$\Sigma$") 35.

The multiplier 31 is input with a received symbol of the pilot signal and a complex conjugate of the received symbol. The pilot signal is a known signal, and the complex conjugate thereof can be derived beforehand. The multiplier 31 multiplies the received symbol input thereto by the complex conjugate of the received symbol.

The delay unit 32 delays the timing of the symbol output from the multiplier 31. The complex conjugate calculator 33 calculates the complex conjugate of the symbol delayed by the delay unit 32, and outputs the calculated complex conjugate to the multiplier 34. The multiplier 34 multiplies the symbol output from the multiplier 31 by the complex conjugate of the delayed symbol.

The integrator 35 integrates the symbol (frequency offset) output from the multiplier 34, to calculate an average value of the frequency offset. An averaging time for averaging the frequency offset is instructed from the high speed discriminator 40. Specifically, when the radio terminal 12 is moving at high speed, the averaging time is instructed to be shortened, and when the radio terminal 12 is moving at low speed, the averaging time is instructed to be longer than that applied during the high-speed movement.

It is assumed here that the received symbol of the pilot signal input to the multiplier 31 is expressed, for example, by the following equation (1):

$$R(n+1) = whe^{x(n+1)i} \qquad (1)$$

where n is a positive integer and represents the reception timing of the received symbol. Symbol w represents the pattern of the pilot signal, h represents channel response, and x represents phase rotation.

The multiplier 31 multiplies the received symbol, expressed by the equation (1), by the complex conjugate of the known pilot pattern, and therefore, the output thereof can be expressed by the following equation (2):

$$r(n+1) = w^* w h e^{x(n+1)i} = h e^{x(n+1)i} \qquad (2)$$

The symbol output from the delay unit 32 is one symbol timing later than the output of the multiplier 31 and thus can be expressed by the following equation (3):

$$r(n) = h e^{xni} \qquad (3)$$

The output of the complex conjugate calculator 33 is the complex conjugate of the equation (3) and thus can be expressed by the following equation (4):

$$r(n)^* = h^* e^{-xni} \qquad (4)$$

The output of the multiplier 34 is the product of the equations (2) and (4) and therefore can be expressed by the following equation (5):

$$z = h e^{x(n+1)i} \times h^* e^{-xni} = |h|^2 e^{xi} \qquad (5)$$

As seen from the equation (5), the output of the multiplier 34 represents the frequency offset (phase rotation) of the radio signal (received signal). The integrator 35 integrates the output of the multiplier 34, indicated by the equation (5), and outputs an average value of same, whereby an estimated value of the frequency offset is obtained.

The high speed discriminator 40 will be now explained. The high speed discriminator 40 includes an argument calculator (in FIG. 4, "arg(z)") 41, an absolute value calculator (in FIG. 4, "|x|") 42, a temporal averaging unit 43, and a discriminator 44.

The argument calculator 41 calculates the argument of the symbol output from the multiplier 34. Namely, the argument calculator 41 obtains the argument of the frequency offset. The symbol input to the argument calculator 41 is expressed by the equation (5) above, and therefore, the output of the argument calculator 41 can be expressed by the following equation (6):

$$x = arg(z) \qquad (6)$$

The absolute value calculator 42 obtains the absolute value of the argument output from the argument calculator 41. The temporal averaging unit 43 calculates an averaged absolute value of the argument output from the absolute value calculator 42.

Based on the averaged absolute value of the argument output from the temporal averaging unit 43, the discriminator 44 determines whether the radio terminal 12 is moving at high speed or at low speed. When the radio terminal 12 is moving at high speed, the absolute value of the argument of the frequency offset assumes a large value, and when the radio terminal 12 is moving at low speed, the absolute value of the argument of the frequency offset assumes a small value. Accordingly, if the absolute value of the argument is greater than a predetermined threshold, for example, the discriminator 44 judges that the radio terminal 12 is moving at high speed, and if the absolute value of the argument is smaller than the predetermined threshold, the discriminator 44 judges that the radio terminal 12 is moving at low speed. The result of the determination by the discriminator 44 is output to the integrator 35 of the frequency offset calculator 30. In accordance with the determination result provided by the discriminator 44, the integrator 35 changes the averaging time for averaging the frequency offset, as stated above.

FIGS. 5A to 5D illustrate operation of the high speed discriminator appearing in FIG. 4. In FIGS. 5A and 5C, the radio base station 11 and the radio terminal 12 are illustrated. It is assumed that as time elapses, the radio terminal 12 moves in the direction indicated by arrow A1 in FIGS. 5A and 5C.

FIG. 5A illustrates the manner of how the argument changes when the radio terminal 12 moves at high speed. Namely, FIG. 5A illustrates the output of the argument calculator 41 observed when the radio terminal 12 moves at high speed. Because of the Doppler effect, the polarity of the argument reverses at a point near the radio base station 11 as the radio terminal 12 passes by the radio base station 11. In FIG. 5A, the horizontal axis indicates time, and the vertical axis indicates the argument.

The absolute value calculator 42 calculates the absolute value of the argument output from the argument calculator 41. Accordingly, when the radio terminal 12 moves at high speed, the absolute value calculator 42 provides an output indicated by dotted line B1 in FIG. 5A.

FIG. 5B illustrates a time average of the absolute argument (absolute value of the argument) indicated in FIG. 5A. Namely, FIG. 5B illustrates the output of the temporal averaging unit 43 observed when the radio terminal 12 moves at high speed. In the illustrated example, the temporal averaging unit 43 calculates an average value of the absolute argument during the period from time t1 to time t2, and calculates an average value of the absolute argument during the period from time t2 to time t3. The period from time t1 to t2 and the period from time t2 to t3 are equal in length. In FIG. 5B, the horizontal axis indicates time, and the vertical axis indicates the averaged absolute argument.

FIG. 5C illustrates how the argument changes when the radio terminal 12 moves at low speed. Namely, FIG. 5C illustrates the output of the argument calculator 41 during low-speed movement of the radio terminal 12. Due to the Doppler effect, the polarity of the argument reverses at a point near the radio base station 11 as the radio terminal 12 passes by the radio base station 11. In FIG. 5C, the horizontal axis indicates time, and the vertical axis indicates the argument.

The absolute value calculator 42 calculates the absolute value of the argument output from the argument calculator 41. Accordingly, when the radio terminal 12 moves at low speed, the absolute value calculator 42 provides an output indicated by dotted line B2 in FIG. 5C.

FIG. 5D illustrates a time-averaged value of the absolute argument indicated in FIG. 5C. Namely, FIG. 5D illustrates the output of the temporal averaging unit 43 during the low-speed movement of the radio terminal 12. In the illustrated example, the temporal averaging unit 43 averages the absolute argument during the period from time t1 to time t2, and averages the absolute argument during the period from time t2 to time t3. In FIG. 5D, the horizontal axis indicates time, and the vertical axis indicates the averaged absolute argument.

The magnitude of the absolute argument is related with the moving speed of the radio terminal 12. Thus, by comparing the averaged absolute argument with a predetermined threshold, the discriminator 44 can determine whether the radio terminal 12 is moving at high speed or at low speed.

For example, if the averaged absolute argument is greater than the threshold th as indicated in FIG. 5B, the discriminator 44 judges that the radio terminal 12 is moving at high speed. If the averaged absolute argument is smaller than or equal to the threshold th as indicated in FIG. 5D, the discriminator 44 judges that the radio terminal 12 is moving at low speed. When the radio terminal 12 is moving at high speed, the argument calculated by the argument calculator 41 suddenly changes as indicated in FIG. 5A. Consequently, the decrease in the absolute argument output from the absolute value calculator 42 is small as indicated by arrow A2 in FIG. 5A, compared with the decrease indicated by arrow A4 in FIG. 5C, so that the decrease in the averaged absolute argument is also small as indicated by arrow A3 in FIG. 5B, compared with the decrease indicated by arrow A5 in FIG. 5D. Thus, when the radio terminal 12 passes by the radio base station 11 at high speed, the discriminator 44 can be prevented from making an erroneous determination that the radio terminal 12 is moving at low speed.

The reason for comparing the averaged absolute argument with the threshold is as follows: If the absolute argument is compared with the threshold, for example, the absolute argument (instantaneous value of the absolute argument) drops below the threshold at the time indicated by arrow A2 in FIG. 5A, creating the possibility that the discriminator 44 judges that the radio terminal 12 is moving at low speed, even though the radio terminal 12 is in fact moving at high speed.

Figure 6:
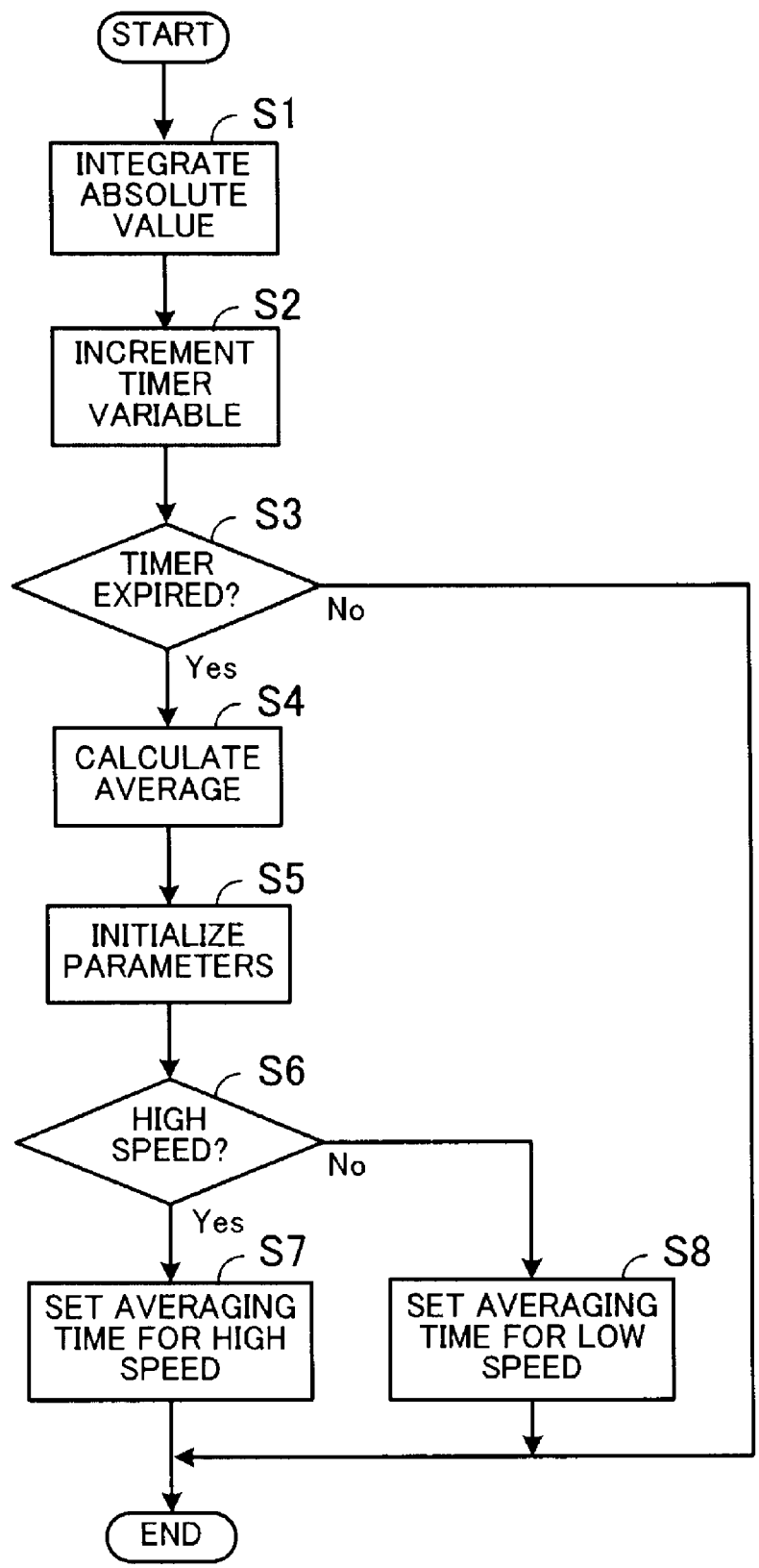
FIG. 6 is a flowchart illustrating operation of the frequency offset estimator.

FIG. 6 is a flowchart illustrating the operation of the frequency offset estimator.

In Step S1, the argument calculator 41 calculates the argument of the frequency offset output from the multiplier 34 of the frequency offset calculator 30. The absolute value calculator 42 obtains the absolute value of the argument calculated by the argument calculator 41. The temporal averaging unit 43 integrates the absolute argument output from the absolute value calculator 42. For example, the temporal averaging unit 43 adds the absolute argument to an integrating variable S.

In Step S2, the temporal averaging unit 43 adds "1" to a timer variable t.

In Step S3, the temporal averaging unit 43 determines whether or not the time set in the timer has expired. For example, the temporal averaging unit 43 compares the timer variable t with a timer expiry variable N (fixed value) and, if the timer variable t has become greater than the timer expiry variable N, proceeds to Step S4. If the timer variable t is smaller than or equal to the timer expiry variable N, the process ends.

In Step S4, the temporal averaging unit 43 calculates an averaged absolute argument. Specifically, the temporal averaging unit 43 divides the integrated absolute argument by the timer expiry variable N, to obtain a time-averaged value of the absolute argument. The temporal averaging unit 43 stores the calculated time-averaged value of the absolute argument as an absolute argument average variable R, for example.

In Step S5, the temporal averaging unit 43 initializes the parameters. Specifically, the temporal averaging unit 43 initializes both the integrating variable S and the timer variable t to "0".

In Step S6, based on the time-averaged value of the absolute argument calculated by the temporal averaging unit 43, the discriminator 44 determines whether or not the radio terminal 12 is moving at high speed. For example, the discriminator 44 compares the absolute argument average variable R with the threshold th. If the absolute argument average variable R is greater than the threshold th, it is judged that the radio terminal 12 is moving at high speed, whereupon the process proceeds to Step S7. On the other hand, if the absolute argument average variable R is smaller than or equal to the threshold th, it is judged that the radio terminal 12 is moving at low speed, whereupon the process proceeds to Step S8.

In Step S7, the discriminator 44 sets the averaging time of the integrator 35 of the frequency offset calculator 30 to an averaging time for high speed estimation.

In Step S8, the discriminator 44 sets an averaging time for low speed estimation, as the averaging time of the integrator 35 of the frequency offset calculator 30.

The averaging time for high speed estimation is shorter than that for low speed estimation. Thus, when the averaging time for high speed estimation is set in the integrator 35, the capability to track the frequency offset improves. On the other hand, when the averaging time for low speed estimation is set in the integrator 35, the control stability improves, though the frequency offset tracking capability lowers, thereby improving the tolerance to noise and the like.

In this manner, the radio base station 11 determines the moving speed of the radio terminal 12 and controls its frequency offset tracking capability as well as its control stability. The radio base station 11 can therefore receive the radio signal with improved reception quality regardless of whether the radio terminal 12 is moving at high speed or at low speed.

Also, since the radio base station 11 determines the moving speed of the radio terminal 12 and controls its frequency offset tracking capability as well as its control stability, the tracking capability and control stability settings of the radio base station 11 need not be changed depending on the place where the radio base station 11 is installed. For example, in cases where the radio base station 11 is installed within a tunnel for Shinkansen bullet trains, it is unnecessary to raise in advance the frequency offset tracking capability of the radio base station 11.

In the foregoing embodiment, the radio base station 11 classifies the moving speed of the radio terminal 12 into two different speed regions, but may alternatively be configured to classify the moving speed into more than two speed regions. For example, a plurality of (two or more) thresholds may be set for determining the moving speed of the radio terminal 12, and an applicable speed region may be selected by determining which of the thresholds is exceeded by the averaged absolute argument. In this case, the discriminator 44 selects an averaging time corresponding to the determined speed, from among multiple averaging times, and sets the selected averaging time in the integrator 35.

The aforementioned control techniques for the frequency offset tracking capability and the control stability can be applied to the radio terminal 12.

A second embodiment will be now described. In the first embodiment, the threshold for determining the moving speed of the radio terminal is fixed regardless of the terminal's moving speed. In the second embodiment, different thresholds are used depending on the moving speed of the radio terminal, thereby providing hysteresis in the determination of the speed of the radio terminal to prevent erroneous judgment from being made.

Figure 7:
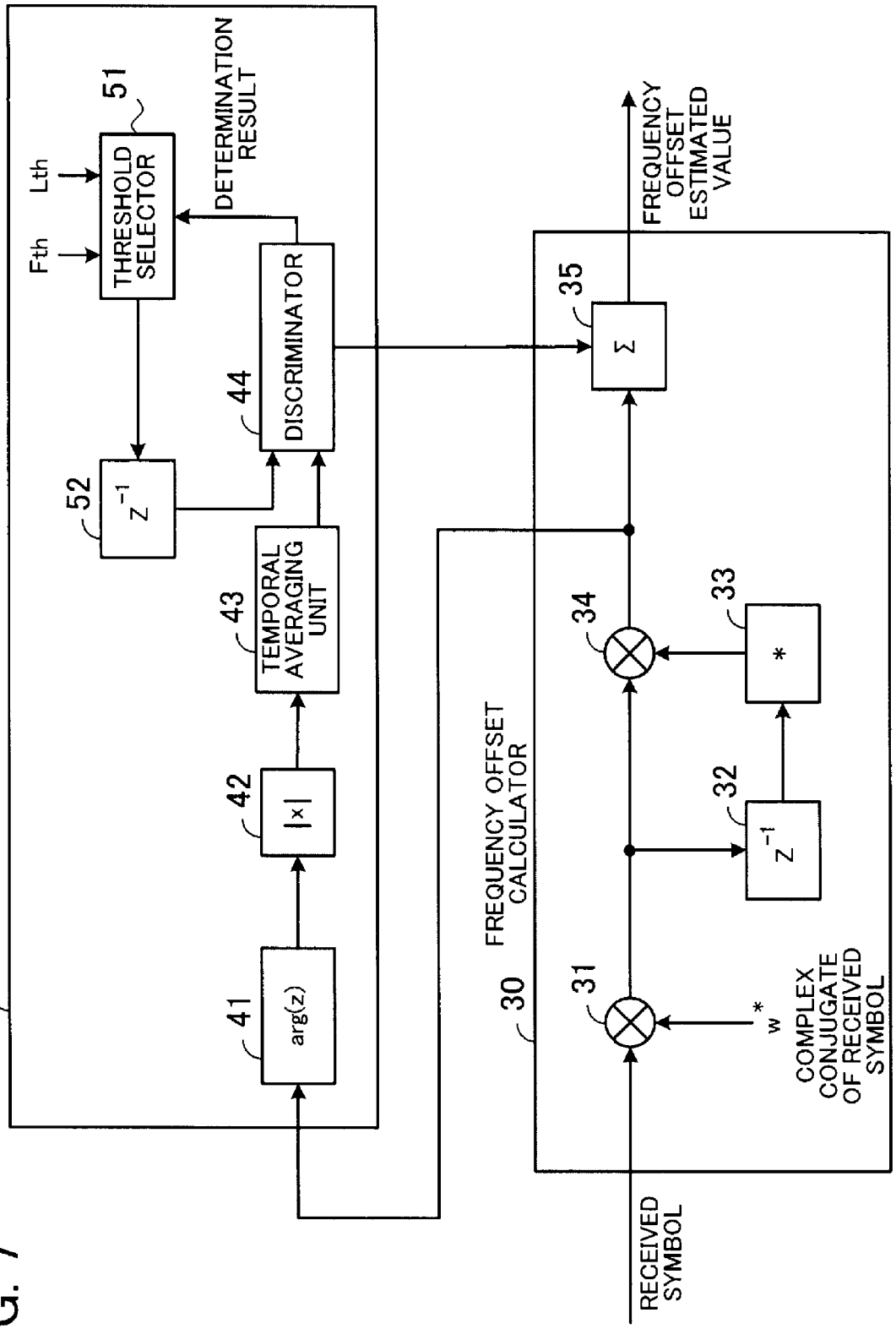
FIG. 7 is a block diagram of a frequency offset estimator according to a second embodiment.

FIG. 7 is a block diagram of a frequency offset estimator according to the second embodiment. In FIG. 7, like reference numerals are used to denote like elements also appearing in FIG. 4, and detailed description of such elements is omitted.

As illustrated in FIG. 7, a high speed discriminator 50 includes the argument calculator 41, the absolute value calculator 42, the temporal averaging unit 43, the discriminator 44, a threshold selector 51, and a delay unit 52.

The threshold selector 51 is input with thresholds Fth and Lth, by means of which the discriminator 44 determines the moving speed of the radio terminal. In accordance with the result of the speed determination by the discriminator 44, the threshold selector 51 selects the threshold Fth or Lth, and outputs the selected threshold to the delay unit 52. Specifically, when the radio terminal 12 is judged to be moving at high speed by the discriminator 44, the threshold selector 51 selects the threshold Fth for high speed determination, and outputs the selected threshold Fth to the delay unit 52. When the radio terminal 12 is judged to be moving at low speed by the discriminator 44, the threshold Lth for low speed determination is selected and output to the delay unit 52. The thresholds Fth and Lth have the relationship indicated by the following expression (7):

$$Fth < Lth \tag{7}$$

The delay unit 52 delays the threshold Fth or Lth, selected by the threshold selector 51, for one reception timing and outputs the delayed threshold to the discriminator 44. Accordingly, the threshold Fth or Lth selected by the threshold selector 51 is reflected in the determination of the discriminator 44 at the next reception timing of the pilot signal.

If the discriminator 44 erroneously judges the radio terminal 12 to be moving at low speed even though the radio terminal 12 is moving at high speed, the frequency offset calculator 30 fails to track change in the frequency offset, with the result that the estimated value of the frequency offset contains substantial error. In this case, voice communication with the radio terminal 12 is interrupted, for example.

On the other hand, when an erroneous judgment is made by the discriminator 44 that the radio terminal 12, which is in fact moving at low speed, is moving at high speed, the estimated value of the frequency offset contains much error but the frequency offset calculator 30 can track change of the frequency offset. In this case, voice communication with the radio terminal 12 is not interrupted, though the reception quality deteriorates.

In the high speed discriminator 50 illustrated in FIG. 7, the two thresholds are prepared to provide hysteresis in the determination by the discriminator 44 so that the fast-moving radio terminal 12 may not be erroneously judged to be moving at low speed.

Let it be assumed, for example, that the radio terminal 12 is currently judged to be moving at high speed by the discriminator 44 and that the threshold Fth for high speed determination is being output from the threshold selector 51.

The discriminator 44 compares the currently selected threshold Fth with the averaged absolute argument output from the temporal averaging unit 43. If the averaged absolute argument is greater than the threshold Fth, the discriminator 44 judges that the radio terminal 12 is moving at high speed. If the averaged absolute argument is smaller than or equal to the threshold Fth, the discriminator 44 judges that the radio terminal 12 is moving at low speed.

The thresholds Fth and Lth have the relationship indicated by the expression (7) above. Accordingly, the discriminator 44 does not judge the radio terminal to be moving at low speed unless and until the averaged absolute argument drops to or below the threshold Fth smaller than the threshold Lth. Namely, once the radio terminal 12 is judged to be moving at high speed, the discriminator 44 does not readily return to a judgment that the radio terminal 12 is moving at low speed, thereby preventing the fast-moving radio terminal 12 from being erroneously judged to be moving at low speed. Thus, erroneous judgment as to the moving speed of the radio terminal 12 can be prevented.

The threshold Fth is preferably set as an initial threshold value in order that the fast-moving radio terminal 12 may not be judged at first to be moving at low speed.

Figure 8:
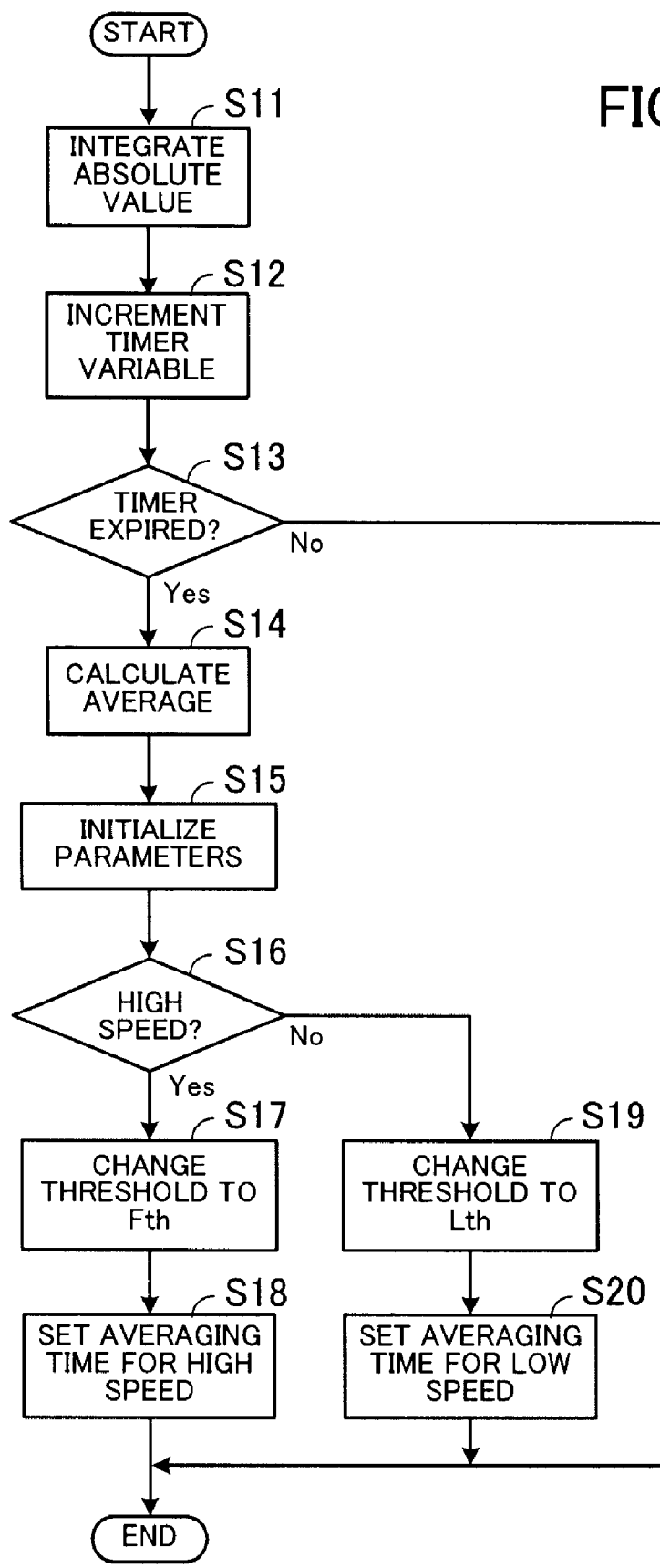
FIG. 8 is a flowchart illustrating operation of the frequency offset estimator.

FIG. 8 is a flowchart illustrating the operation of the frequency offset estimator. In FIG. 8, Steps S11 through S15 are respectively identical with Steps S1 through S5 in FIG. 6, and therefore, description of these steps is omitted.

In Step S16, the discriminator 44 compares the absolute argument average variable R with the threshold th, to determine the moving speed of the radio terminal 12. If the absolute argument average variable R is greater than the threshold th, it is judged that the radio terminal 12 is moving at high speed, whereupon the process proceeds to Step S17. On the other hand, if the absolute argument average variable R is smaller than or equal to the threshold th, the radio terminal 12 is judged to be moving at low speed, and the process proceeds to Step S19.

In Step S17, the threshold selector 51 substitutes, for the threshold th, the threshold Fth for high speed determination. Since the threshold Fth for high speed determination is delayed for one reception timing by the delay unit 52, the threshold Fth is reflected in the determination of the discriminator 44 at the next reception timing.

In Step S18, the discriminator 44 sets the averaging time of the integrator 35 of the frequency offset calculator 30 to the one for high speed estimation.

In Step S19, the threshold selector 51 substitutes, for the threshold th, the threshold Lth for low speed determination. The threshold Lth for low speed determination is delayed for one reception timing by the delay unit 52, and therefore, the threshold Lth is reflected in the determination of the discriminator 44 at the next reception timing.

In Step S20, the discriminator 44 sets the averaging time of the integrator 35 of the frequency offset calculator 30 to the one for low speed estimation.

Thus, different thresholds are used for determining high and low speeds, respectively, of the radio terminal 12 so that hysteresis may be provided in the determination of the moving speed of the radio terminal 12. It is therefore possible to prevent erroneous judgment as to the moving speed of the radio terminal 12.

A third embodiment will be now described. In the first embodiment, the averaging time for which the absolute argument is averaged in the high speed discriminator is set to a fixed time at all times. In the third embodiment, the averaging time for which the absolute argument is averaged in the high speed discriminator is varied in accordance with the moving speed of the radio terminal.

Figure 9:
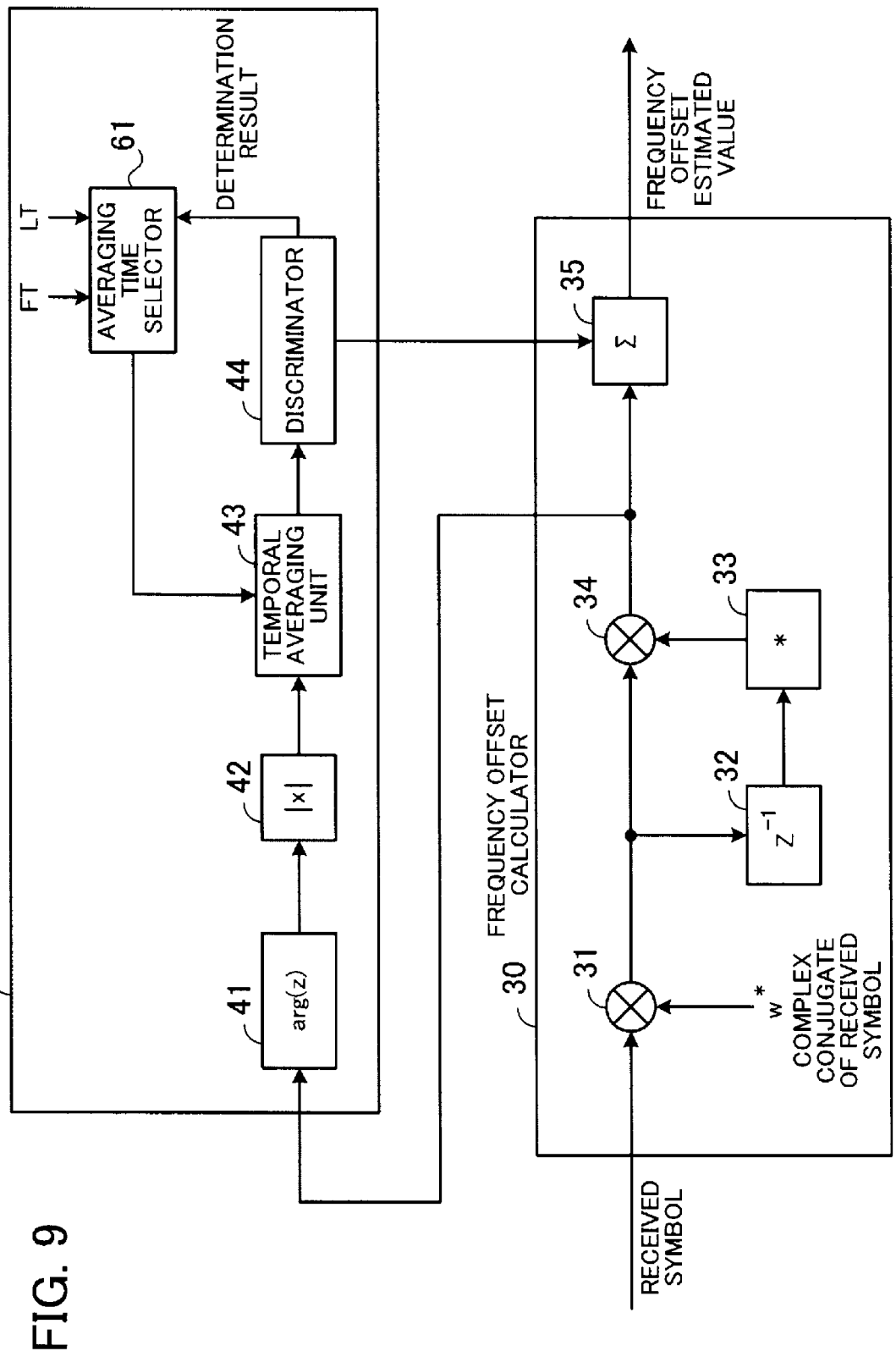
FIG. 9 is a block diagram of a frequency offset estimator according to a third embodiment.

FIG. 9 is a block diagram of a frequency offset estimator according to the third embodiment. In FIG. 9, like reference numerals are used to denote like elements also appearing in FIG. 4, and detailed description of such elements is omitted.

As illustrated in FIG. 9, a high speed discriminator 60 includes the argument calculator 41, the absolute value calculator 42, the temporal averaging unit 43, the discriminator 44, and an averaging time selector 61.

The averaging time selector 61 is input with averaging times FT and LT, for which the absolute argument is to be averaged by the temporal averaging unit 43. In accordance with the result of the speed determination by the discriminator 44, the averaging time selector 61 selects the averaging time FT or LT and outputs the selected averaging time to the temporal averaging unit 43. Specifically, if it is judged by the discriminator 44 that the radio terminal 12 is moving at high speed, the averaging time selector 61 outputs the averaging time FT for high speed to the temporal averaging unit 43. If it is judged by the discriminator 44 that the radio terminal 12 is moving at low speed, the averaging time LT for low speed is output to the temporal averaging unit 43. The averaging times FT and LT bear the relationship indicated by the following expression (8):

$$FT > LT \qquad (8)$$

If the radio terminal 12, which is in fact moving at high speed, is judged to be moving at low speed, interruption of voice communication or the like is caused, as stated above with reference to the second embodiment.

Thus, in the high speed discriminator 60 illustrated in FIG. 9, the two averaging times are prepared to vary the absolute argument averaging time so that the fast-moving radio terminal 12 may not be erroneously judged to be moving at low speed.

Let it be assumed, for example, that the radio terminal 12 is currently judged to be moving at high speed by the discriminator 44 and that the averaging time FT for high speed is being output from the averaging time selector 61. In this case, the temporal averaging unit 43 averages the absolute argument output from the absolute value calculator 42 over the averaging time FT output from the averaging time selector 61.

The averaging times FT and LT have the relationship indicated by the expression (8) above. Accordingly, when the radio terminal 12 is judged to be moving at high speed by the discriminator 44, the absolute argument is averaged for a time period longer than in the case where the radio terminal 12 is judged to be moving at low speed.

Where the absolute argument averaging time is prolonged, variation in the averaged absolute argument is small even if the absolute argument decreases as indicated by arrow A2 in FIG. 5A, for example. Namely, the decrease in the averaged absolute argument, indicated by arrow A3 in FIG. 5B, can be made small. It is therefore possible to prevent the fast-moving radio terminal 12 from being erroneously judged to be moving at low speed.

Also, since the two averaging times FT and LT are used, hysteresis is provided in the determination made by the discriminator 44. For example, where the radio terminal 12 is currently judged to be moving at high speed by the discriminator 44 and thus the averaging time FT is being selected by the averaging time selector 61, the discriminator 44 does not readily make a judgment that the radio terminal 12 is moving at low speed. This prevents erroneous judgment as to the moving speed of the radio terminal 12.

The averaging time FT is preferably set as an initial averaging time in order that the fast-moving radio terminal 12 may not be judged at first to be moving at low speed.

Figure 10:
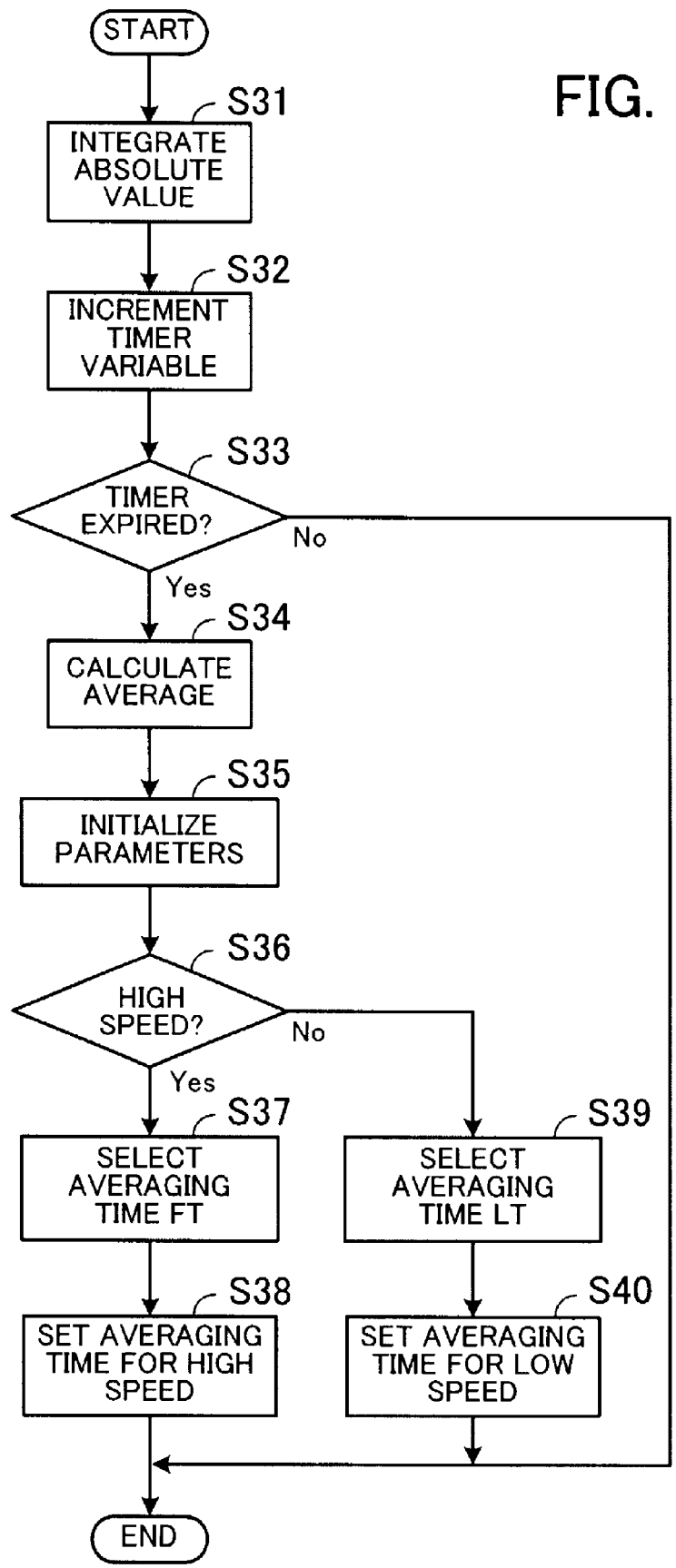
FIG. 10 is a flowchart illustrating operation of the frequency offset estimator.

FIG. 10 is a flowchart illustrating the operation of the frequency offset estimator. In FIG. 10, Steps S31 through S35 are respectively identical with Steps S1 through S5 in FIG. 6, and therefore, description of these steps is omitted.

In Step S36, the discriminator 44 compares the absolute argument average variable R with the threshold th, to determine the moving speed of the radio terminal 12. If the absolute argument average variable R is greater than the threshold th, it is judged that the radio terminal 12 is moving at high speed, whereupon the process proceeds to Step S37. On the other hand, if the absolute argument average variable R is smaller than or equal to the threshold th, the radio terminal 12 is judged to be moving at low speed, and the process proceeds to Step S39.

In Step S37, the averaging time selector 61 selects the averaging time FT for high speed and outputs the selected averaging time FT to the temporal averaging unit 43. The temporal averaging unit 43 substitutes the averaging time FT for the timer expiry variable N. Consequently, the timer expiry time used in Step S33 is replaced, thus varying the averaging time for averaging the absolute argument.

In Step S38, the discriminator 44 sets the averaging time of the integrator 35 of the frequency offset calculator 30 to the one for high speed estimation.

In Step S39, the averaging time selector 61 selects the averaging time LT for low speed and outputs the selected averaging time LT to the temporal averaging unit 43. The temporal averaging unit 43 substitutes the averaging time LT for the timer expiry variable N. Thus, the timer expiry time checked in Step S33 is changed, thereby varying the absolute argument averaging time.

In Step S40, the discriminator 44 sets the averaging time of the integrator 35 of the frequency offset calculator 30 to the one for low speed estimation.

Thus, the absolute argument averaging time is varied in accordance with the moving speed of the radio terminal 12. It is therefore possible to prevent erroneous judgment from being made as to the moving speed of the radio terminal 12.

A fourth embodiment will be now described. In the first embodiment, the averaging time of the integrator in the frequency offset calculator is varied to change the frequency offset tracking capability and the control stability. In the fourth embodiment, the frequency offset averaging method itself is switched in accordance with the moving speed of the radio terminal, to change the frequency offset tracking capability and the control stability.

Figure 11:
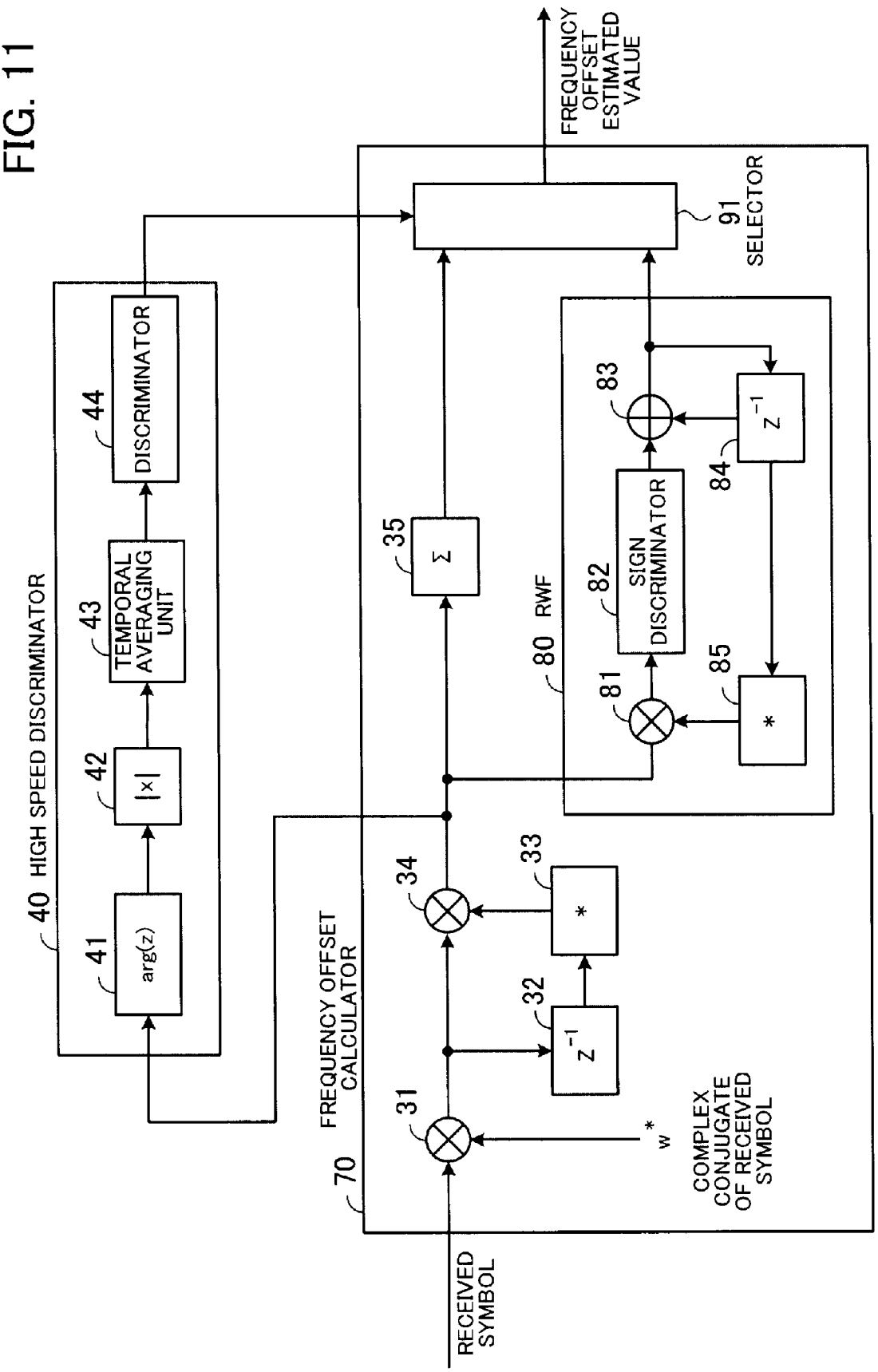
FIG. 11 is a block diagram of a frequency offset estimator according to a fourth embodiment.

FIG. 11 is a block diagram of a frequency offset estimator according to the fourth embodiment. In FIG. 11, like reference numerals are used to denote like elements also appearing in FIG. 4, and detailed description of such elements is omitted.

As illustrated in FIG. 11, a frequency offset calculator 70 includes the multipliers 31 and 34, the delay unit 32, the complex conjugate calculator 33, the integrator 35, an RWF (Random Walk Filter) 80, and a selector 91.

The RWF 80 includes a multiplier 81, a sign discriminator 82, an adder 83, a delay unit 84, and a complex conjugate calculator 85.

The multiplier 81 multiplies the symbol output from the multiplier 34 by the complex conjugate symbol output from the complex conjugate calculator 85. The sign discriminator 82 compares the argument of the symbol output from the multiplier 34 with the argument of the symbol which is one reception timing earlier than the present symbol, to determine whether the argument is advanced or retarded. If the argument is advanced, "1" is output; if the argument is retarded, "−1" is output.

The adder 83 adds together the step "1" or "−1" output from the sign discriminator 82 and the step output from the delay unit 84. The delay unit 84 delays the step output from the adder 83 for one reception timing, and outputs the delayed step to the adder 83 and the complex conjugate calculator 85.

The complex conjugate calculator 85 calculates the complex conjugate of the step output from the delay unit 84, and outputs the calculated complex conjugate to the multiplier 81.

The RWF 80 varies the frequency offset output from the multiplier 34 only by the step size "1" or "−1" per reception timing of the received symbol, regardless of the magnitude of the frequency offset. Namely, the RWF 80 functions like an LPF (Low Pass Filter).

The selector 91 is input with the signal output from the integrator 35 and the signal output from the RWF 80. In accordance with the result of the radio terminal speed determination output from the discriminator 44, the selector 91 selects one of the input signals as an estimated value of the frequency offset, and outputs the selected signal to the channel estimator 26 and the detector 27.

Specifically, when the radio terminal 12 is judged to be moving at high speed by the discriminator 44, the selector 91 selects the signal output from the integrator 35. On the other hand, when the radio terminal 12 is judged to be moving at low speed by the discriminator 44, the signal output from the RWF 80 is selected and output. The averaging time of the integrator 35 is set somewhat short so as to improve the frequency offset tracking capability when the radio terminal 12 is moving at high speed. When the radio terminal 12 is moving at low speed, the signal output from the RWF 80 is selected, and accordingly, the control stability improves, though the frequency offset tracking capability lowers.

Figure 12:
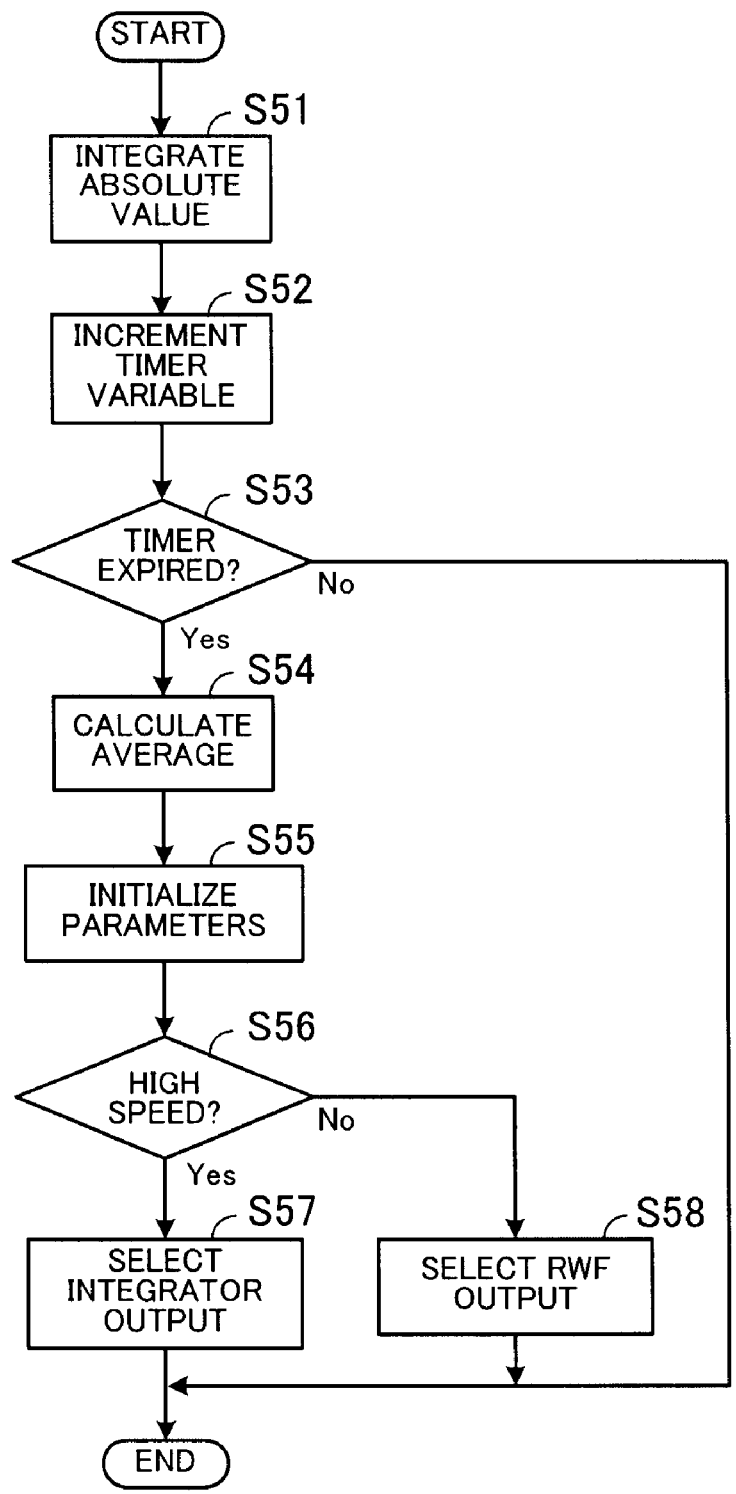
FIG. 12 is a flowchart illustrating operation of the frequency offset estimator.

FIG. 12 is a flowchart illustrating the operation of the frequency offset estimator. In FIG. 12, Steps S51 through S55 are respectively identical with Steps S1 through S5 in FIG. 6, and therefore, description of these steps is omitted.

In Step S56, the discriminator 44 compares the absolute argument average variable R with the threshold th, to determine the moving speed of the radio terminal 12. If the absolute argument average variable R is greater than the threshold th, it is judged that the radio terminal 12 is moving at high speed, whereupon the process proceeds to Step S57. On the other hand, if the absolute argument average variable R is smaller than or equal to the threshold th, the radio terminal 12 is judged to be moving at low speed, and the process proceeds to Step S58.

In Step S57, the selector 91 selects the frequency offset output from the integrator 35, because the radio terminal 12 is judged to be moving at high speed by the discriminator 44.

In Step S58, the selector 91 selects the frequency offset output from the RWF 80, since the radio terminal 12 is judged to be moving at low speed by the discriminator 44.

Thus, by switching the frequency offset averaging method, it is also possible to improve the reception quality regardless of whether the radio terminal 12 is moving at high speed or at low speed.

The foregoing embodiments can be combined with each other. For example, the second embodiment can be combined with the third embodiment. Also, the second and fourth embodiments may be used in combination, and the third and fourth embodiments may be used in combination. Further, the second to fourth embodiments can be combined.

With the disclosed apparatus and method, it is possible to improve the reception quality of radio signals from associated radio communication apparatuses regardless of whether the associated radio communication apparatuses are moving at high speed or at low speed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention have been described in detail, it should be understood that various changes, substitutions and alterations could be made hereto without departing from the spirit and scope of the invention.

What is claimed is:

1. A radio communication apparatus configured to calculate a frequency offset, comprising:
   a frequency offset calculator which calculates the frequency offset of a received radio signal from a reception frequency of the radio communication apparatus;
   an averaging unit which averages the frequency offset calculated by the frequency offset calculator;
   a moving speed calculator which calculates a moving speed of an associated radio communication apparatus with which the radio communication apparatus is communicating, based on the frequency offset calculated by the frequency offset calculator; and
   an averaging time changer which changes an averaging time for which the frequency offset is averaged by the averaging unit, in accordance with the moving speed of the associated radio communication apparatus calculated by the moving speed calculator.

2. The radio communication apparatus according to claim 1, wherein the moving speed calculator includes:
   an argument calculator which calculates an argument of the radio signal based on the frequency offset calculated by the frequency offset calculator;
   an absolute value calculator which calculates an absolute value of the argument calculated by the argument calculator;
   an absolute value averaging unit which averages the absolute value of the argument calculated by the absolute value calculator; and
   a speed discriminator which compares an averaged absolute value of the argument, obtained by the absolute value averaging unit, with a threshold to determine the moving speed of the associated radio communication apparatus.

3. The radio communication apparatus according to claim 2, wherein the moving speed calculator further includes a threshold changer which changes the threshold in accordance with the moving speed of the associated radio communication apparatus determined by the speed discriminator.

4. The radio communication apparatus according to claim 2, wherein the moving speed calculator further includes an absolute value averaging time changer which changes an averaging time for which the absolute value of the argument is averaged by the absolute value averaging unit, in accordance with the moving speed of the associated radio communication apparatus determined by the speed discriminator.

5. A radio communication apparatus configured to calculate a frequency offset, comprising:
   a frequency offset calculator which calculates the frequency offset of a received radio signal from a reception frequency of the radio communication apparatus;
   an averaging unit which averages the frequency offset calculated by the frequency offset calculator;
   a moving speed calculator which calculates a moving speed of an associated radio communication apparatus with which the radio communication apparatus is communicating, based on the frequency offset calculated by the frequency offset calculator; and
   an averaging method changer which changes an averaging method of the averaging unit in accordance with the moving speed of the associated radio communication apparatus calculated by the moving speed calculator.

6. A frequency offset calculation method for a radio communication apparatus configured to calculate a frequency offset, comprising:
   calculating the frequency offset of a received radio signal from a reception frequency of the radio communication apparatus;
   calculating, based on the frequency offset, a moving speed of an associated radio communicating apparatus with which the radio communication apparatus is communicating; and
   changing an averaging time for which the frequency offset is averaged, in accordance with the moving speed of the associated radio communication apparatus.

7. A frequency offset calculation method for a radio communication apparatus configured to calculate a frequency offset, comprising:
   calculating the frequency offset of a received radio signal from a reception frequency of the radio communication apparatus;
   calculating, based on the frequency offset, a moving speed of an associated radio communicating apparatus with which the radio communication apparatus is communicating; and
   changing an averaging method for averaging the frequency offset, in accordance with the moving speed of the associated radio communication apparatus.

* * * * *